J. I. HULL.
SPEED REGULATING SET.
APPLICATION FILED JULY 26, 1916.
1,321,042.
Patented Nov. 4, 1919.
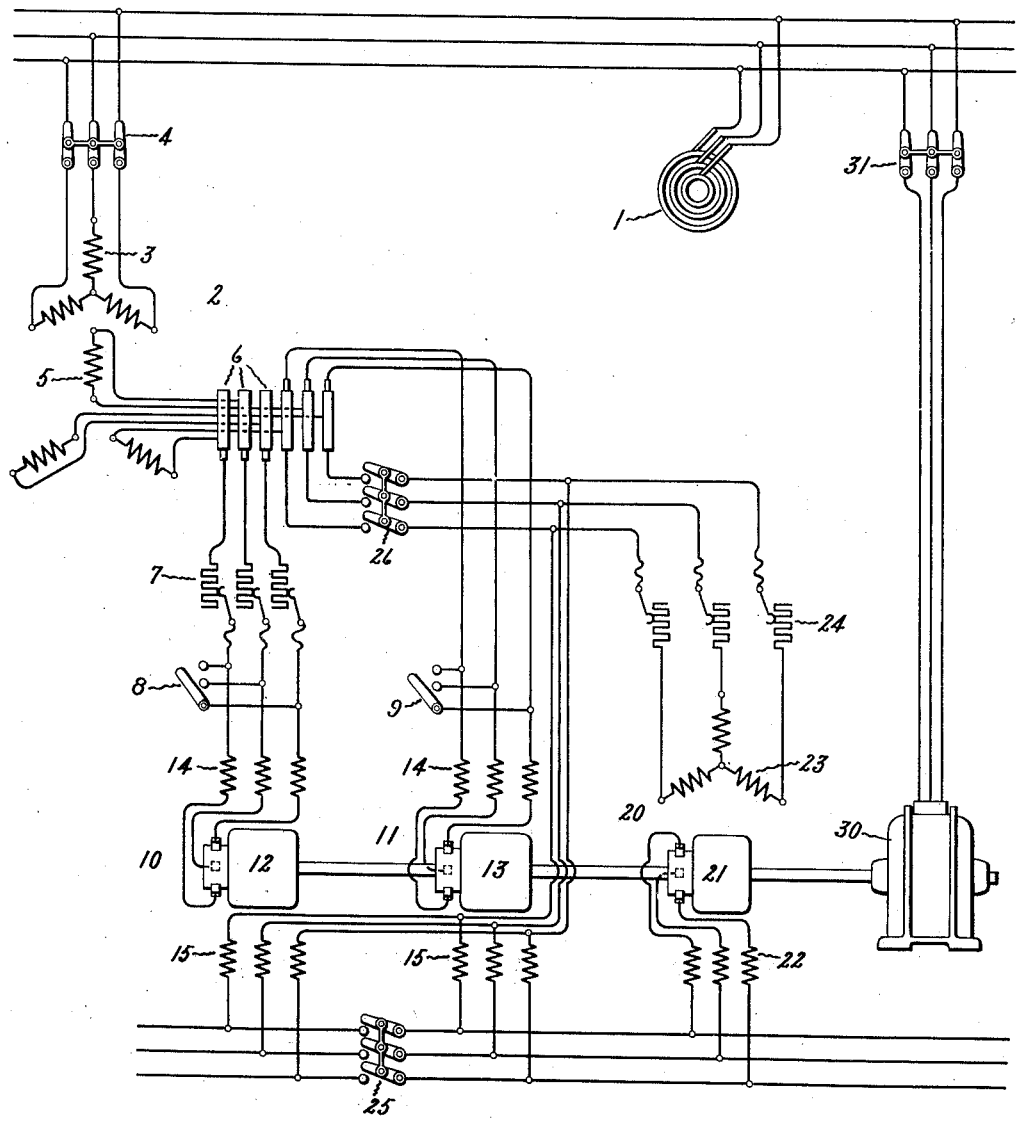
Inventor:
John I. Hull,
by *Albert Davis*
His Attorney.

UNITED STATES PATENT OFFICE.

JOHN I. HULL, OF SCHENECTADY, NEW YORK, ASSIGNOR TO GENERAL ELECTRIC COMPANY, A CORPORATION OF NEW YORK.

SPEED-REGULATING SET.

1,321,042.   Specification of Letters Patent.   Patented Nov. 4, 1919.

Application filed July 26, 1916. Serial No. 111,528.

*To all whom it may concern:*

Be it known that I, JOHN I. HULL, a citizen of the United States, residing at Schenectady, in the county of Schenectady, State of New York, have invented certain new and useful Improvements in Speed-Regulating Sets, of which the following is a specification.

My invention relates to speed regulating sets for induction motors and particularly to an arrangement of the type wherein a dynamo-electric machine is concatenated with the induction motor.

It is well known that the speed of an induction motor may be easily and economically controlled by regulating the potential difference between the terminals of the secondary winding of the motor by connecting a dynamo-electric machine in cascade therewith and then varying its excitation. This machine is commonly either a rotary converter or an alternating current commutator machine and, in either case, severe limitations are imposed upon the practical voltage for which such machines can be designed. For large induction motors with a large range of regulation, this limitation may make the secondary starting and running current abnormally large, much larger in fact than the current for which the secondary of such a motor would be designed if it were not hampered by the regulating machine. Now, it is well understood that the maximum slip voltage at starting is to the maximum permissible commutator machine voltage as 100% is to the maximum per cent. range of regulation. For example, if we assume the maximum permissible commutator voltage as 300 volts, an induction motor of a certain size might, with a speed range of 25%, have a slip voltage of 1200 volts at starting while this same motor with a 50% speed range would perhaps have a slip voltage at starting of only 600 volts with a proportionately larger current. Thus, the design of the regulating machine might limit the slip voltage to 600 volts, for a 50% speed range, and therefore, give the motor an abnormally large slip-ring current. This would entail, besides a disadvantageous design of the motor secondary, a very considerable increase in the size and cost of the control apparatus such as switches, contactors, rheostats, and so on.

I have conceived that a regulating means capable of individually controlling the potential difference at its terminals, might be connected to each set of terminals of the secondary winding, one or both of said regulating means comprising a dynamo-electric machine. By such an arrangement, the voltage of the secondary winding can be doubled, without forcing up the operating voltage of the regulating machine, and in this way brought up to about the value which would naturally be selected were the design unhampered by the requirements of the regulating machines, and it is only necessary to provide a regulating machine of half the capacity which would normally be required for the corresponding size of motor. Furthermore, my new arrangement gives the advantage of enabling the development of a line of regulating machines having a limited number of sizes with rather widely separated ratings. Induction motors requiring intermediate sizes could then be provided with two regulating machines of either equal or unequal sizes. In order that either one or both of the regulating means may be utilized I can, if desired, provide a device for cutting one of them out of service as, for example, by short circuiting it.

For a more complete understanding of the operation and advantages of my invention reference may be had to the following specification, taken in connection with the accompanying drawing in which the single figure is a diagrammatic view illustrating the apparatus and connections employed.

Power is furnished from a source of supply 1 to an induction motor 2, whose primary winding 3 is connected to the source of supply through a disconnecting switch 4. Each set of terminals of the secondary winding 5 of this motor is provided with slip rings 6, by means of which connection may be readily made thereto. In starting the induction motor a variable resistance 7 is preferably employed. During this operation the switches 8 and 9 will be closed. After the induction motor has been brought approximately to its working speed, the switches 8 and 9 may be opened and the terminals of the secondary winding connected to the regulating dynamo electric machines 10 and 11. For the sake of simplicity, I have illustrated these machines as alternating current commutator machines, but it will be obvious to those skilled in the art that any of the other well known schemes of regulation employing dynamo electric machines capable of individually controlling its terminal voltage might equally well be employed. Each of these machines comprises a commuted winding 12 and 13 which is connected through its brushes and a compensating winding 14 to corresponding terminals of the secondary winding of the main induction motor. The customary exciting windings 15 are also supplied, and are here shown as connected in a well understood manner between the terminals of the secondary winding and the brushes of an exciter 20, whereby the excitation is determined by the algebraic sum of the slip voltage and the exciter voltage. This exciter is a commutator machine of similar construction to the regulating machines, and comprises a commuted winding 21, compensating winding 22, and an exciting winding 23. This exciting winding is connected through an adjustable resistance 24 to one set of terminals of the secondary winding of the main induction motor. An intermediate switch 25 will be arranged between the exciting windings of the regulating machines in order that machine 11 may be employed, for example, when the machine 10 has been cut out of service by the closure of the short circuiting switch 8. Still another switch 26 may be inserted between the various exciting windings and the motor slip rings. The rotating parts of the regulating machines and of the exciter may be mechanically connected to the rotating member of an asynchronous machine 30, whose primary winding is connected to the source of supply through a switch 31, or they may be arranged in other manners well known in the art, for example, by mechanically connecting them to the main induction motor.

When both of the regulating machines are being utilized the speed of the induction motor may be controlled by varying the excitation supplied by the exciter, thereby simultaneously controlling the excitation of the regulating machines. During this operation each of the regulating machines will develop a rotation tension which is one-half, if these machines are of equal size, of the total secondary voltage of the main induction motor. As will be obvious to those skilled in the art, it will not be necessary to operate both of the regulating machines during the whole range of regulation, and for a certain part of the range one of the machines may be cut out of service, for example, by short circuiting the same. It will also be obvious that the size of the regulating machines may be either equal or unequal. If I desire, I may combine two sorts of regulating means as, for example, by utilizing a single dynamo-electric machine for the speed regulation over a moderate range in order to secure an economical operation, and then combining with it some other form of regulating means such as resistance 7 connected to the other set of terminals of the secondary winding, in order to further increase the potential difference which must be balanced by the secondary voltage.

Although I have herein illustrated one desirable embodiment of my invention, it will be understood that various modifications thereof will be at once evident to one skilled in the art, such for example, as the substitution of other forms of dynamo-electric machines for the machines 10 and 11, and other forms of excitation for such machines wherein the exciter 20 is either omitted or differently arranged. Accordingly I do not desire to be limited to the exact arrangement shown, but seek to cover in the appended claims all those modifications which come within the true scope and spirit of my invention.

What I claim as new and desire to secure by Letters Patent of the United States, is:—

1. In combination, an induction motor having a secondary winding provided with two sets of terminals, two commutator machines each provided with an exciting winding, means for connecting one of said machines to one set of terminals of said secondary, means for connecting the other machine to the other set of terminals of said secondary winding, and means connected to both of said exciting windings and adapted to regulate the excitation of said machines at the same time to thereby control the speed of said motor.

2. In combination, an induction motor having a secondary winding provided with two sets of terminals, two commutator machines each provided with an exciting winding, means for connecting one of said machines to one set of terminals of said secondary winding, means for connecting the other machine to the other set of terminals of said secondary winding, and means connected to both of said exciting windings and adapted to change the magnitude of the voltage of said machines at the same time to thereby control the speed of said motor.

3. In combination, an induction motor having a secondary winding provided with two sets of terminals, two variable voltage dynamo-electric machines, each provided with an exciting winding, means for connecting one of said machines to one set of terminals of the secondary winding of said motor, means for connecting the other of said machines to the other set of terminals of the secondary winding of said motor, and an exciter connected to the exciting windings of said machines.

4. In combination, a source of supply, an induction motor having its primary winding connected to said source, and having a secondary winding provided with two sets of terminals, two commutator machines each provided with an exciting winding, means for connecting one of said machines to one set of terminals of the secondary winding of said motor, means for connecting the other of said machines to the other set of terminals of the secondary winding of said motor, and an exciter connected to the exciting windings of said machines.

5. In combination, an induction motor having a secondary winding provided with two sets of terminals, two variable voltage dynamo-electric machines each provided with an exciting winding, means for connecting one of said machines to one set of terminals of the secondary winding of said motor, means for connecting the other of said machines to the other set of terminals of the secondary winding of said motor, means for short-circuiting one of said machines, and an exciter connected to the exciting windings of said machines.

6. In combination, an induction motor having a secondary winding provided with two sets of terminals, two commutator machines each provided with an exciting winding, means for connecting one of said machines to one set of terminals of the secondary winding of said motor, means for connecting the other of said machines to the other set of terminals of the secondary winding of said motor, means for short circuiting one of said machines, and an exciter connected to the exciting windings of said machines.

7. In combination, a source of supply, an induction motor having its primary winding connected to said source, and having a secondary winding provided with two sets of terminals, two commutator machines each provided with an exciting winding, means for connecting one of said machines to one set of terminals of the secondary winding of said motor, means for connecting the other machine to the other set of terminals of the secondary winding of said motor, means for short circuiting one of said machines, an exciter connected to the exciting windings of said machines, means for controlling said exciter, an asynchronous machine having its primary winding connected to said source of supply, and means for mechanically connecting the rotating parts of said asynchronous machine, said commutator machines and said exciter.

In witness whereof, I have hereunto set my hand this 25th day of July, 1916.

JOHN I. HULL.